(12) United States Patent
Yan

(10) Patent No.: US 11,174,076 B2
(45) Date of Patent: Nov. 16, 2021

(54) FULLY RECYCLABLE ENVIRONMENTAL PROTECTION PACKAGING STRUCTURE

(71) Applicant: Beta (Shenzhen) Package Products Co., Ltd, Shenzhen (CN)

(72) Inventor: Jinwei Yan, Shenzhen (CN)

(73) Assignee: Beta (Shenzhen) Package Products Co., Ltd, Shenzhen (CN)

(*) Notice: Subject to any disclaimer, the term of this patent is extended or adjusted under 35 U.S.C. 154(b) by 0 days.

(21) Appl. No.: 17/207,773

(22) Filed: Mar. 22, 2021

(65) Prior Publication Data

US 2021/0206535 A1 Jul. 8, 2021

Related U.S. Application Data

(60) Continuation-in-part of application No. 16/878,645, filed on May 20, 2020, which is a division of (Continued)

(30) Foreign Application Priority Data

| Mar. 29, 2019 | (CN) | 201910252856.0 |
| Mar. 29, 2019 | (CN) | 201920419356.7 |
| Aug. 8, 2019 | (CN) | 201910731634.7 |
| Mar. 3, 2021 | (CN) | 202110237367.5 |

(51) Int. Cl.
*B32B 3/26* (2006.01)
*B32B 1/02* (2006.01)
(Continued)

(52) U.S. Cl.
CPC ............ *B65D 31/16* (2013.01); *B31B 70/005* (2017.08); *B31B 70/02* (2017.08); *B31B 70/024* (2017.08); *B31B 70/20* (2017.08); *B31B 70/26* (2017.08); *B31B 70/62* (2017.08); *B32B 1/00* (2013.01); *B32B 1/02* (2013.01); *B32B 3/266* (2013.01); *B32B 29/005* (2013.01); *B65D 31/02* (2013.01); *B65D 65/406* (2013.01); *B65D 65/44* (2013.01); *B65D 65/466* (2013.01); *B65D 81/03* (2013.01); *B32B 2439/06* (2013.01)

(58) Field of Classification Search
CPC .... B32B 1/00; B32B 1/02; B32B 3/10; B32B 3/18; B32B 3/26; B32B 3/263; B32B 3/266; B32B 3/30; B32B 29/005; B32B 2439/06; B65D 31/02; B65D 31/16; B65D 65/406; B65D 65/44; B65D 65/466; B65D 81/03
See application file for complete search history.

(56) References Cited

U.S. PATENT DOCUMENTS

2008/0095961 A1* 4/2008 Knauf .................. B32B 3/08
428/36.1

* cited by examiner

Primary Examiner — Walter Aughenbaugh

(57) ABSTRACT

A fully recyclable environmental protection packaging structure applied to express deliveries, postal services and logistics and made of a planar structure of paper. The packaging structure includes a first surface and a protecting layer overlapped on the surface. The protecting layer includes at least one layer of liner which is a three-dimensional network structure. The packaging structure of the present disclosure can overcome problems that kraft paper bubble bags or envelopes, and paper and plastics can't be separated and recycled to pollute environment in the prior art. At the same time, it can solve technical problems of dust pollution and poor air quality caused by using powdery and granular soft structures used as buffers.

9 Claims, 14 Drawing Sheets

Related U.S. Application Data application No. 16/795,554, filed on Feb. 19, 2020, now Pat. No. 10,850,891.

(51) Int. Cl.
*B65D 30/10* (2006.01)
*B31B 70/02* (2017.01)
*B31B 70/26* (2017.01)
*B31B 70/00* (2017.01)
*B31B 70/20* (2017.01)
*B31B 70/62* (2017.01)
*B32B 1/00* (2006.01)
*B32B 29/00* (2006.01)
*B65D 30/08* (2006.01)
*B65D 65/40* (2006.01)
*B65D 81/02* (2006.01)
*B65D 65/46* (2006.01)
*B65D 81/03* (2006.01)

FULLY RECYCLABLE ENVIRONMENTAL PROTECTION PACKAGING STRUCTURE

CROSS-REFERENCE TO RELATED APPLICATION

This application is a continuation-in-part of U.S. patent application Ser. No. 16/878,645 entitled "MANUFACTURING METHOD OF FULL RECYCLING ENVIRONMENTAL PROTECTION PACKAGING STRUCTURE" and filed on May 20, 2020, the content of which is hereby incorporated by reference in its entirety.

BACKGROUND

Technical Field

The present disclosure generally relates to packages field applied to express deliveries, postal services and logistics fields, and specifically relates to a fully recyclable environmental protection packaging structure.

Description of Related Art

Referring to FIG. 1, in fields of packages in logistics, express deliveries and postal services, especially packaging structures with buffer structures, the buffer structure A is generally used by a plastic board or a plastic foam A1, while, the plastic board and the plastic foam A1 can't be directly adhered to an inner wall of a paper packaging structure. The inner wall of the paper packaging structure is first covered with a thermoplastic plastic film B by a thermoplastics way, and then the plastic board and the plastic foam A1 can be adhered to the thermoplastic plastic film B. The plastic board and the plastic foam A1 are first needed to be tore off and the plastic film B is needed to be separated from the inner wall during recycling and reusing the paper packaging structure. However, the plastic film B is very thin so that it is difficult to be separated from the inner wall, thereby it can't be recycled. For example, a kraft paper bubble bag, with a kraft paper bag body, is commonly used in the current market, the plastic film B is formed on a side of the kraft paper and the plastic foam A1 is set on the plastic film B to be used as buffer material A. Both the plastic film B and the plastic foam A1 can't be separated from each other, thereby the kraft paper bubble bag can't be recycled and naturally degraded resulting in polluting the environment.

Referring to FIG. 2, in other cases, the buffer material is also used to grind and cut other recoverable materials to form a powdery, granular soft structure C, when the packaging structure is produced, such powdered and granular materials are filled as buffers. However, such production process and technology will lead to a production environment where the powder in air seriously exceeds a standard, and a high requirement of manufacturing devices is needed to result in potential harm for the health of workers.

SUMMARY

The technical problems to be solved: in view of the shortcomings of the related art, the present disclosure relates to a fully recyclable environmental protection packaging structure which can solve technical problems that buffer material can't be recycled, environmental pollution and poor working environment.

The technical solution adopted for solving technical problems of the present disclosure is:

a fully recyclable environmental protection packaging structure applied to express deliveries, postal services and logistics, is a bag body and includes a front surface and a back surface opposite to the front surface, both the front surface and the back surface respectively made of a planar structure of paper, the planar structure includes:

a first surface and a protecting layer overlapped on the first surface;

the protecting layer including at least one layer of liner which is a three-dimensional network structure;

the liner including a plurality of rows of unit strips arranged thereof, and each row of unit strips including a plurality of arch structures connected in turn, each arch structure including a first arch structure and a second arch structure; the first arch structure including a first platform segment and two first transition segments respectively arranged on two opposite ends of the first platform segment, and the first platform segment higher than the first transition segment; the second arch structure including a second platform segment and two second transition segments respectively arranged on two opposite sides of the second platform segment, and the second platform segment lower than the second transition segment; the first arch structure arranged alternately with the second arch structure in the same unit strip, the first transition segment of the first arch structure overlapped or connected with the second transition segment of an adjacent second arch structure; and wherein the first transition segment of the first arch structure in the unit strip is connected with the second transition segment of the nearest second arch structure in another adjacent unit strip; a three-dimensional polygonal opening is formed between the second arch structure in one unit strip and the first arch structure in the other unit strip arranged relatively.

In the present disclosure, the arch structure is a twisted structure, which can be formed by being pulled under external forces. The twisted arch structure is a three-dimensional structure so that a plurality of arch structures is arranged into a three-dimensional network to enhance buffer effect thereof.

The protecting layer of the fully recyclable environmental protection packaging structure of the present disclosure can play as a protective buffering role and includes at least one layer of liner with a network structure being stretched after die-cutting it to as a buffer. The whole planar structure is made of paper material, which can overcome the problem of needing to be separated during recycling it in the prior art.

Then, the material of the die-cutting paper and the first surface are paper material so that they can be simply in stock to mix them; when the die-cutting paper is formed by die-cutting the paper material, the die-cutting paper can also be separated with winding paper with coiled material so that it is only needed to unreel and stretch the die-cutting paper in production the planar structure so as to reduce storage costs of the die-cutting paper material as the greatest as possible.

Furthermore, the protecting layer is used by the liner, and the liner is formed by stretching the die-cutting paper after die-cutting it, so, comparing with filling powders, particles, etc., it has less environmental pollution and can reduce potential harm to the health of workers.

Both the liner and base paper of the present disclosure are made of paper material, which isn't needed to be separated during being recycled. In this way, the present disclosure can overcome problems that buffer material can't be separated and recycled to pollute environment in the prior art. At the same time, the liner belt of the present disclosure is used as a buffer to solve technical problems of dust pollution and poor air quality caused by using powdery and granular soft structures used as buffer materials. Furthermore, the liner belt used as the buffer also can achieve a same buffer effect of a conventional plastic board or a conventional plastic foam played as buffer materials, so as to prevent internal articles received in the packaging structure from being damaged.

DETAILED DESCRIPTION

Figure 1:
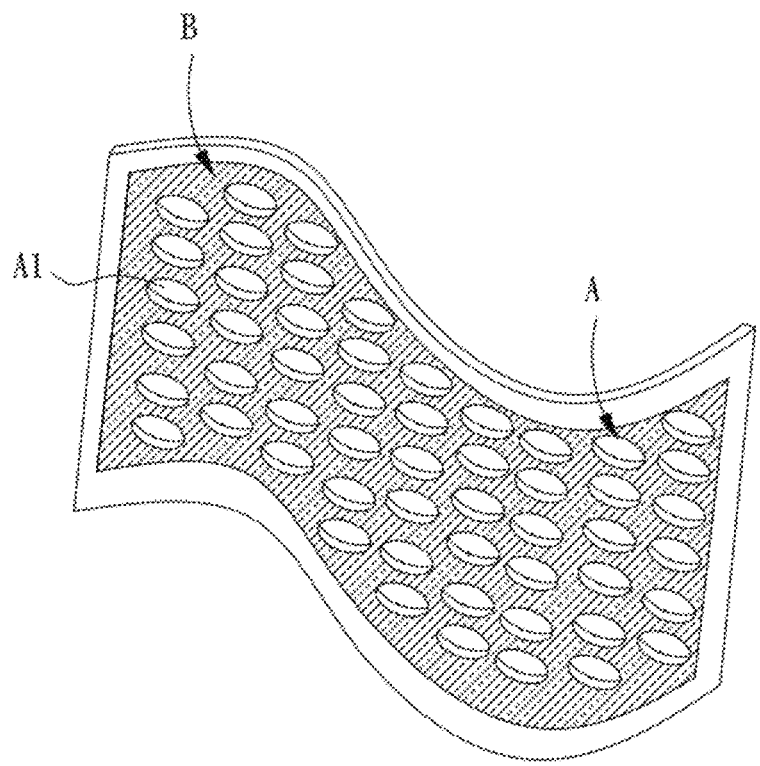
FIG. 1 & FIG. 2 are schematic views of two conventional packaging structures described in the related art.
Figure 2:
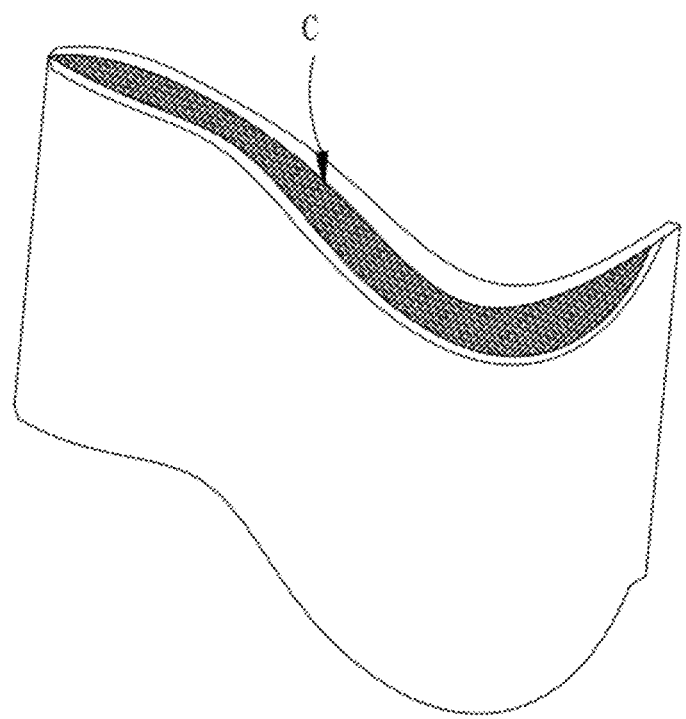

The disclosure is illustrated by way of example and not by way of limitation in the figures of the accompanying drawings, in which like reference numerals indicate similar elements.

Figure 3:
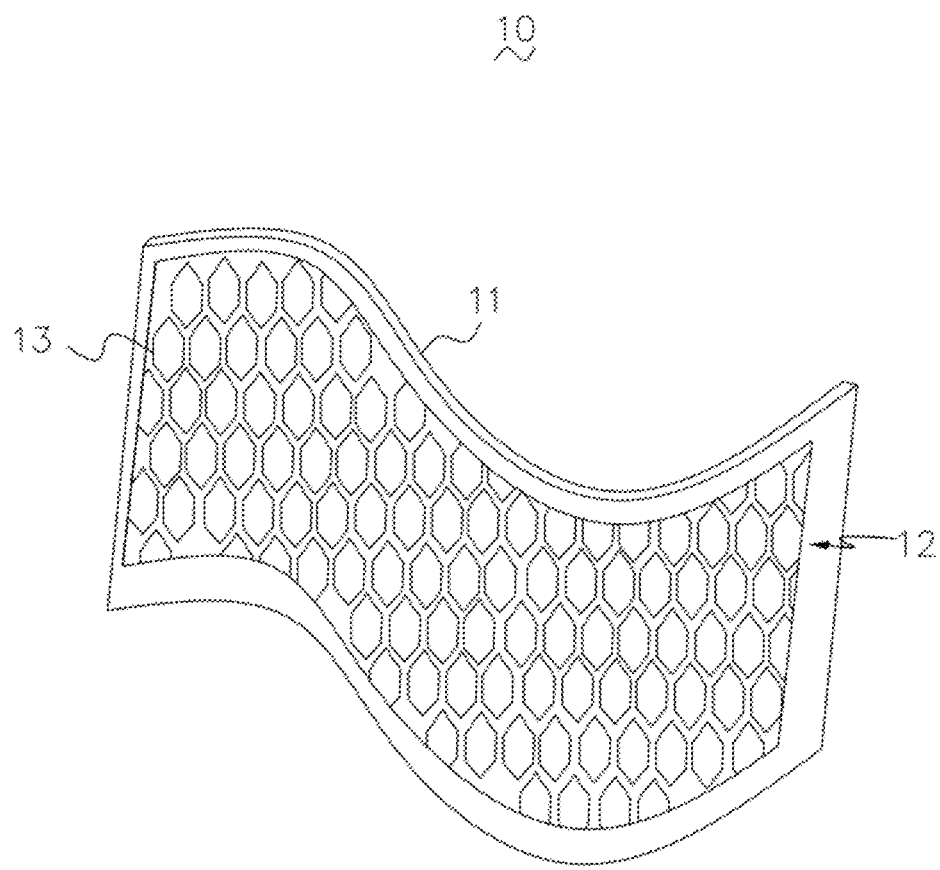
FIG. 3 is a schematic view of a planar structure of a fully recyclable environmental protection packaging structure in accordance with an embodiment of the present disclosure.

Referring to FIG. 3, a fully recyclable environmental protection packaging structure 100 (labeled in FIG. 24) according to an embodiment of the present disclosure is applied to express deliveries, postal services and logistics and made of a planar structure 10 of paper. The planar structure 10 includes a first surface 11 and a protecting layer 12 overlapped on the first surface 11. The first surface 11 is provided for supporting the protecting layer 12 and the protecting layer 12 is provided for acting as shock absorption protection. The planar structure 10 formed by the first surface 11 and the protecting layer 12 can wrap around goods and the outer of expresses so as to prevent express and postal parcels from being damaged.

Figure 4:
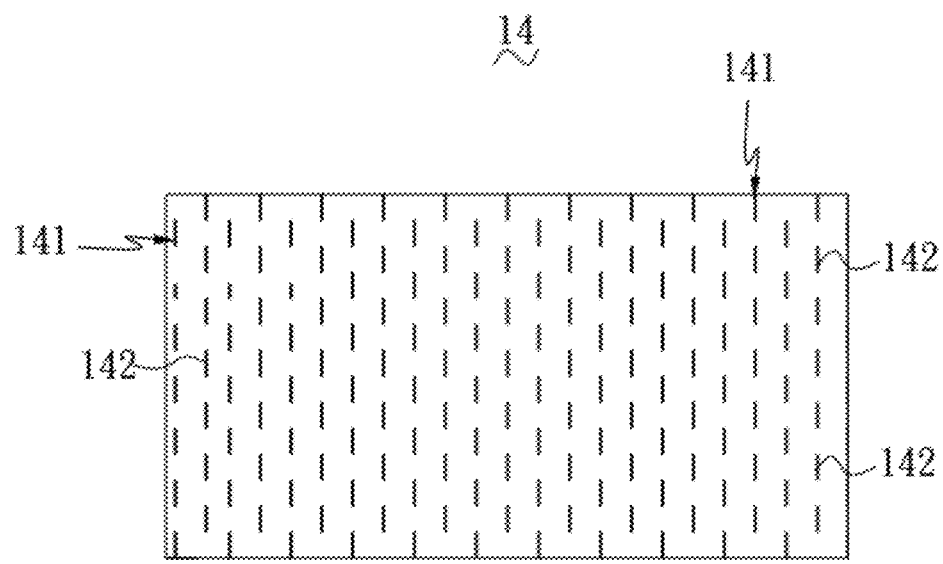
FIG. 4 is a schematic view of a die-cutting paper of a fully recyclable environmental protection packaging structure of the present disclosure.

Referring to FIG. 4, specifically, the protecting layer 12 includes a layer of liner 13 which is a network structure formed by a die-cutting paper 14 being stretched after die-cutting it, that is to say, the liner 13 is another form after the die-cutting paper 14 is stretched.

In accordance with the present disclosure, the die-cutting paper 14 is made of material same as that of the first surface 11, at this time, it can be more convenient and fast to prepare material in order to manufacture the packaging structure 100. The paper material of the first surface 11 and the paper material of the die-cutting paper 14 can be mixed together to reduce the cost of material preparation. Of course, different paper materials can also be used in other embodiments, depending on actual needs and characteristics of packages and express items, for example, the first surface 11 is made of stronger kraft paper, while, the die-cutting paper 14 is made of ordinary writing paper.

Furthermore, a plurality rows of disconnected lines 141 is formed by die-cutting the die-cutting paper 14, and a distance between every two adjacent disconnected lines 141 is same. Each row of disconnected lines 141 includes a plurality of die-cutting knife lines 142 arranged thereon at interval after the each row of disconnected lines 141 is die-cut. Such die-cutting way with equal interval, can reduce the difficulty of die-cutting process and the manufacturing cost.

Figure 5:
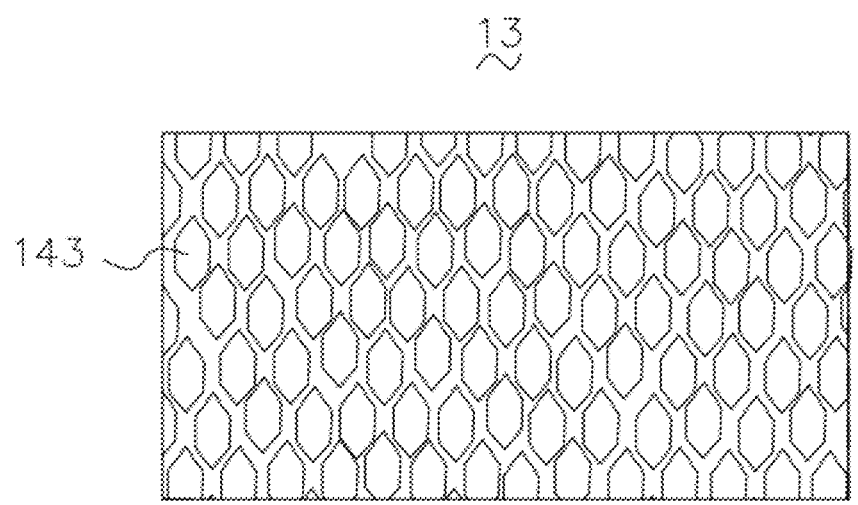
FIG. 5 is a schematic view of a liner formed by the die-cutting paper after stretching the die-cutting paper of the present disclosure.

Referring to FIG. 5, after die-cutting the die-cutting knife line 142 by a die-cutting knife, the die-cutting paper 14 is an indentation formed at a pre-set position of the die-cutting paper 14, it can also be considered as a cutter point for separating the die-cutting paper 14. The die-cutting knife line 142 is intervally arranged on the disconnected line 141, that is, the die-cutting knife line 142 and a part without die-cutting parts are intervally and alternately arranged thereon. Similar intermittent lines are formed on the die-cutting paper 14 so that the die-cutting knife line 142 is a discontinuous part of the intermittent lines. A plurality of die-incisions 143 is located on their respective disconnected lines 141 after the die-cutting paper 14 is stretched and formed by stretching the die-cutting knife line 142. The die-incision 143 is a three-dimensional polygon-shaped configuration and formed by moving and twisting edges of the discontinuous part towards two sides of the die-incision 143. A three-dimensional network structure with multi-rows of polygonal openings is formed thereon after stretching the die-cutting paper 14, and is a soft-tissue structure to play as a protective role when it is overlapped on the first surface 11.

Figure 6:
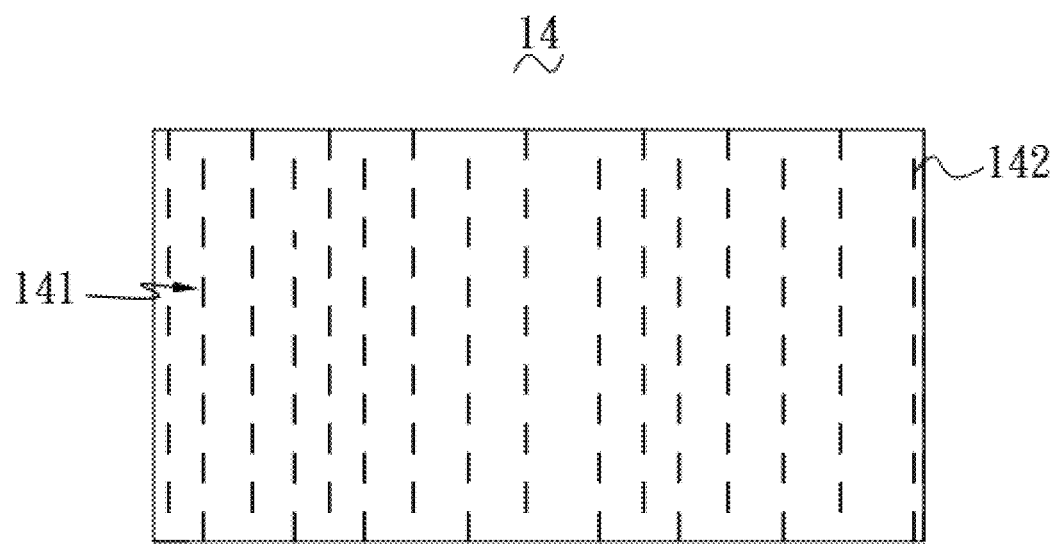
FIG. 6 is a schematic view of another die-cutting paper of a fully recyclable environmental protection packaging structure of the present disclosure.

Referring to FIG. 6, in accordance with the present disclosure, a distance between every two adjacent disconnected lines 141 can also be different according to different protection strength. For example, when the planar structure 10 is used for wrapping a fragile product such as glass, the fragile product needs to be surrounded by the planar structure 10 again and again. A space between the disconnected lines 141 of the planar structure 10 surrounding an inner side of the fragile product is less than a space between the disconnected lines 141 of the planar structure 10 surrounding an outer side of the fragile product, in this way, it can reduce a number of die-cuttings as far as possible and reduce the cost under the conditions without reducing the protection strength premise.

Figure 7:
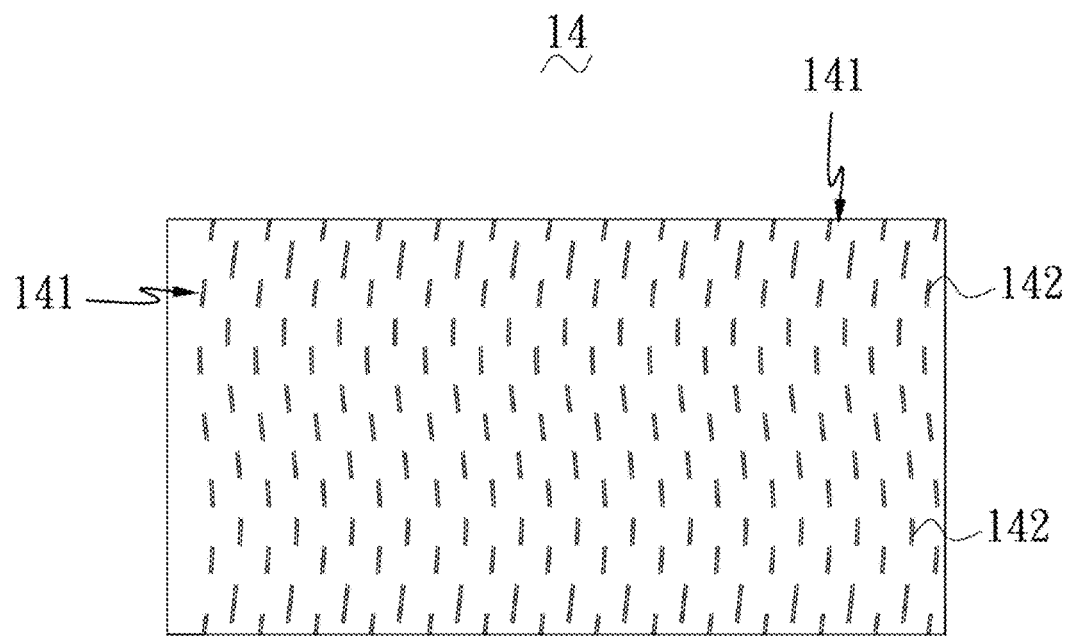
FIG. 7 is a schematic view of another die-cutting paper of a fully recyclable environmental protection packaging structure of the present disclosure.
Figures 8A, 8B:
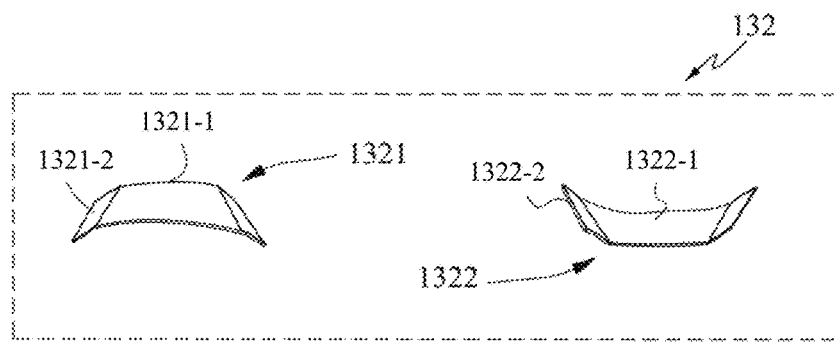
FIG. 8A is a schematic view of a first arch structure of the present disclosure.
FIG. 8B is a schematic view of a second arch structure of the present disclosure.

Referring to FIG. 7, in accordance with the present disclosure, the disconnected line 141 can be a straight line. In another embodiment of the present disclosure, the disconnected line 141 can be an arc. A shape of the disconnected line 141 is not limited, it is only needed to ensure that the disconnected lines 141 are parallel to each other and can be stretched to form a three-dimensional network structure.

Referring to FIGS. 8A-8B, FIG. 9 and FIG. 10A-10B, the liner 13 includes a plurality of rows of unit strips 131 arranged thereof, and each row of unit strips 131 includes a plurality of arch structures 132 connected in turn. Each arch structure 132 includes a first arch structure 1321 and a second arch structure 1322; the first arch structure 1321 includes a first platform segment 1321-1 and two first transition segments 1321-2 respectively arranged on two opposite ends of the first platform segment 1321-1, and the first platform segment 1321-1 is higher than the first transition segment 1321-2. The second arch structure 1322 includes a second platform segment 1322-1 and two second transition segments 1322-2 respectively arranged on two opposite sides of the second platform segment 1322-1, and the second platform segment 1322-1 is lower than the second transition segment 1322-2. The first arch structure 1321 is arranged alternately with the second arch structure 1322 in the same unit strip 131, and the first transition segment 1321-2 of the first arch structure 1321 is overlapped or connected with the second transition segment 1322-2 of an adjacent second arch structure 1322.

The first transition segment 1321-2 of the first arch structure 1321 in the unit strip 131 is connected with the second transition segment 1322-2 of the nearest second arch structure 1322 in another adjacent unit strip 131. A three-dimensional polygonal opening f is formed between the second arch structure 1322 in one unit strip 131 and the first arch structure 1321 in the other unit strip 131 arranged relatively.

In an embodiment of the present disclosure, the arch structure 132 is formed by stretching and twisting the die-cutting paper 14, a position of the three-dimensional polygonal opening f after being twisted and a curved plane where the liner 13 is located are in different planes and different directions. The three-dimensional polygonal opening f is also located in a three-dimensional direction so that the liner 13 is to become a three-dimensional spatial structure.

Furthermore, all the first transition segment 1321-2, the second transition segment 1322-2, the first and second platform segments 1321-1, 1322-1 are not regular curved structures, or even difficult to be distinguished, but an overall distribution trend is still clear in grid arrangements.

Figure 9:
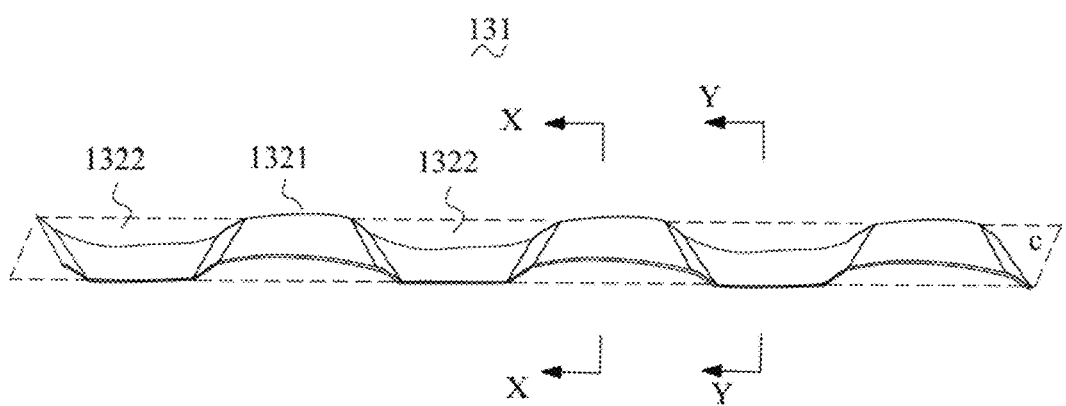
FIG. 9 is a schematic view of a unit strip of the present disclosure.
Figures 10A, 10B:
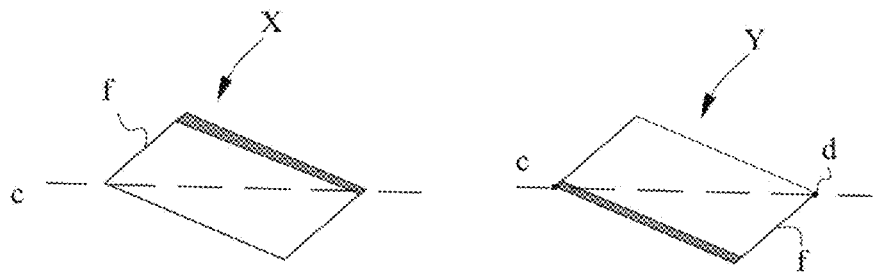
FIG. 10A & FIG. 10B are exploded, schematic views of different positions of the unit strip of FIG. 9.
Figure 11:
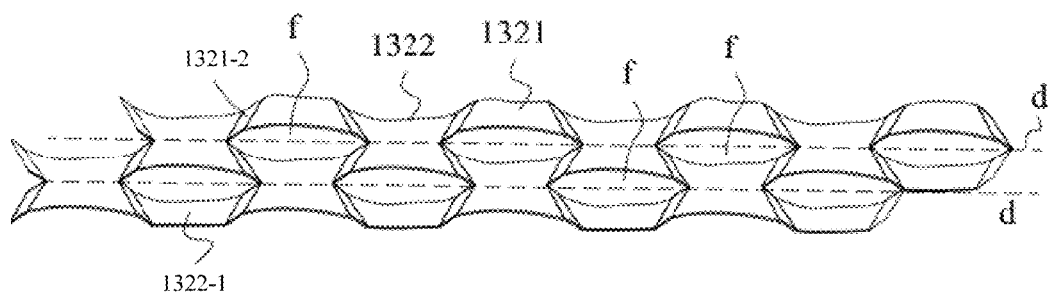
FIG. 11 is a schematic view of a liner with a plurality of unit strips of the present disclosure.

FIG. 10A & FIG. 10B are exploded, schematic views of different positions of the unit strip 131 of FIG. 9. It can be seen from FIG. 10A, a section in the FIG. 10A is the first platform segment 1321-1 of the first arch structure 1321, while a section above the plane c is the first transition segment 1321-2 of the first arch structure 1321, the first transition segment 1321-2 is transited from the plane c to the first platform segment 1321-1 of the first arch structure 1321. While, a section in the FIG. 10B is the second platform segment 1322-1 of the second arch structure 1321, while a section above the plane c is the second transition segment 1322-2 of the second arch structure 1322, the second transition segment 1322-2 is transited from the plane c to the second platform segment 1322-1 of the second arch structure 1322.

Referring to FIGS. 11-14, furthermore, a connecting line d is formed between each two adjacent unit strips 131, and a plane where the connecting lines d are located is a buffer surface e. The first platform segment 1321-1 and the second platform segment 1322-1 are respectively inclined relative to the buffer surface e, the first transition segment 1321-2 is extended from the buffer surface e to the first platform segment 1321-1, and the second transition segment 1322-2 is also extended from the buffer surface e to the second platform segment 1322-1.

Figure 12:
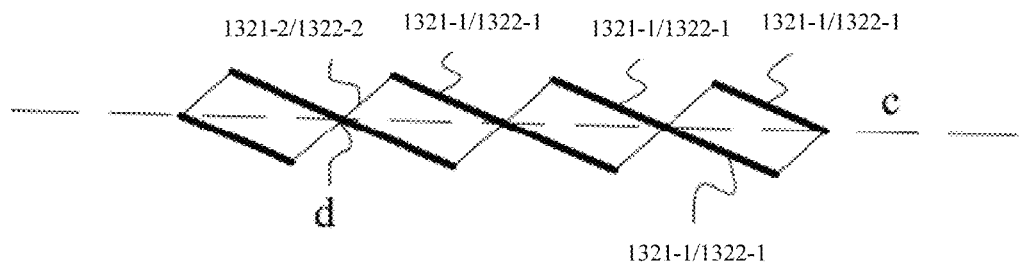
FIG. 12 is a side view of the liner with the plurality of unit strips of the present disclosure.
Figure 13:
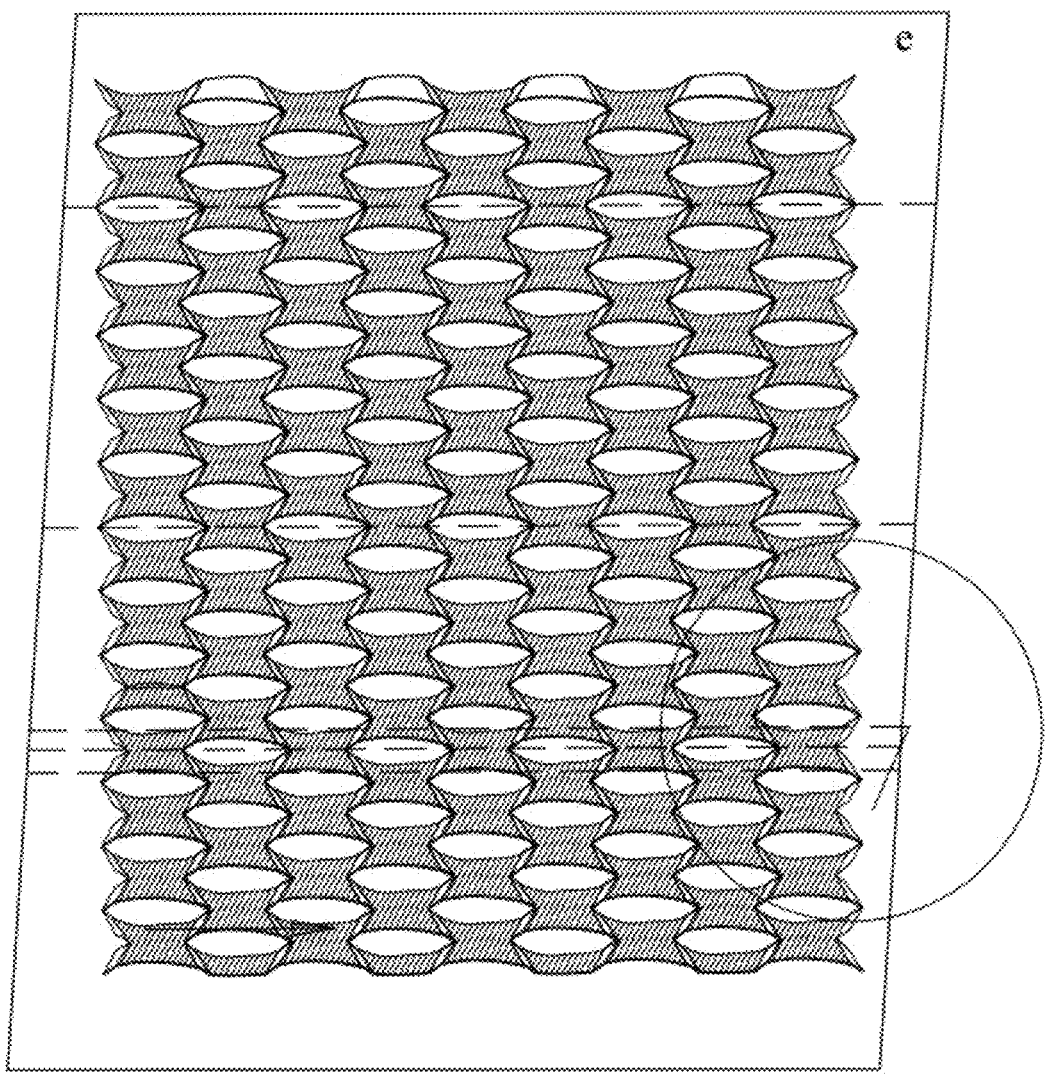
FIG. 13 is a schematic view of the liner of the present disclosure.
Figure 14:
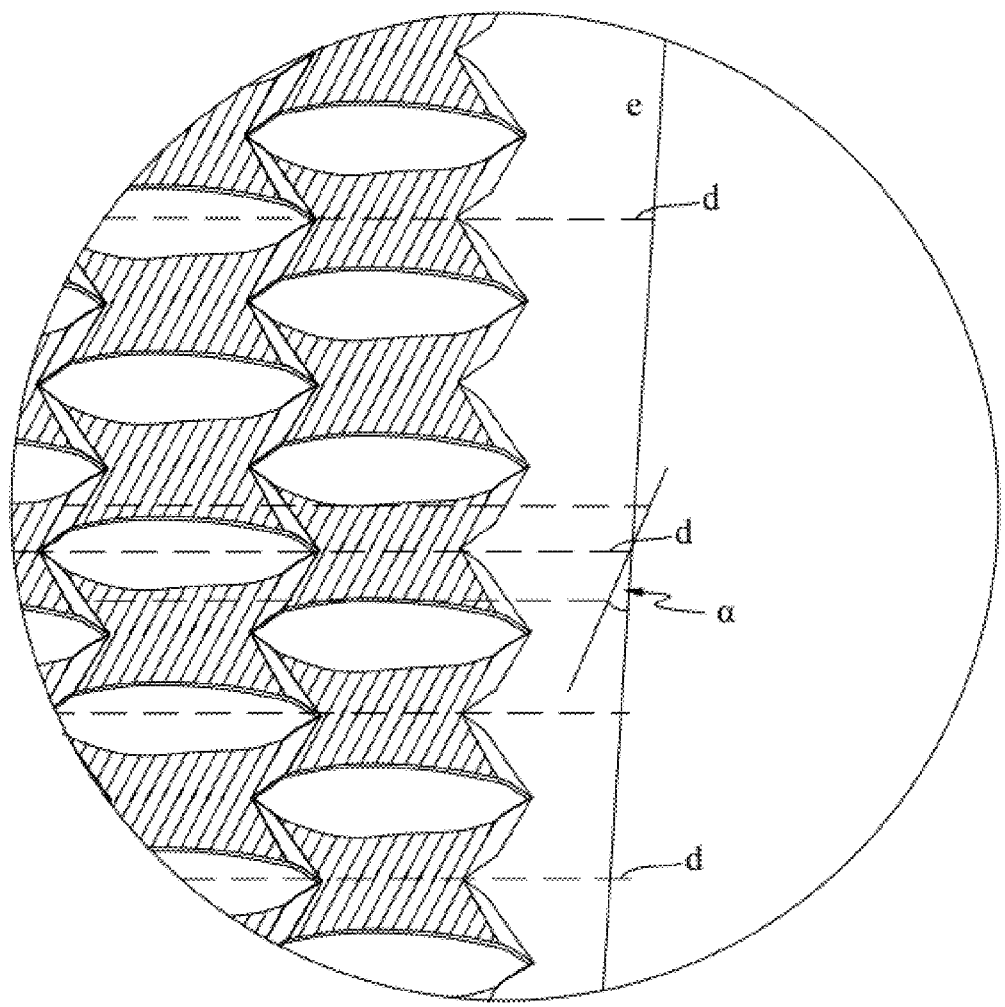
FIG. 14 is a partial enlarged schematic view of the liner of FIG. 13.

In FIG. 12 and FIG. 14, a direction of a force that the liner 13 is buffered is perpendicular to the buffering surface e, when the first platform segment 1321-1 and the second platform segment 1322-1 are respectively inclined to the buffer surface e, the first platform segment 1321-1 and the second platform segment 1322-1 can serve a purpose of enhancing buffer effects respectively.

Figure 15:
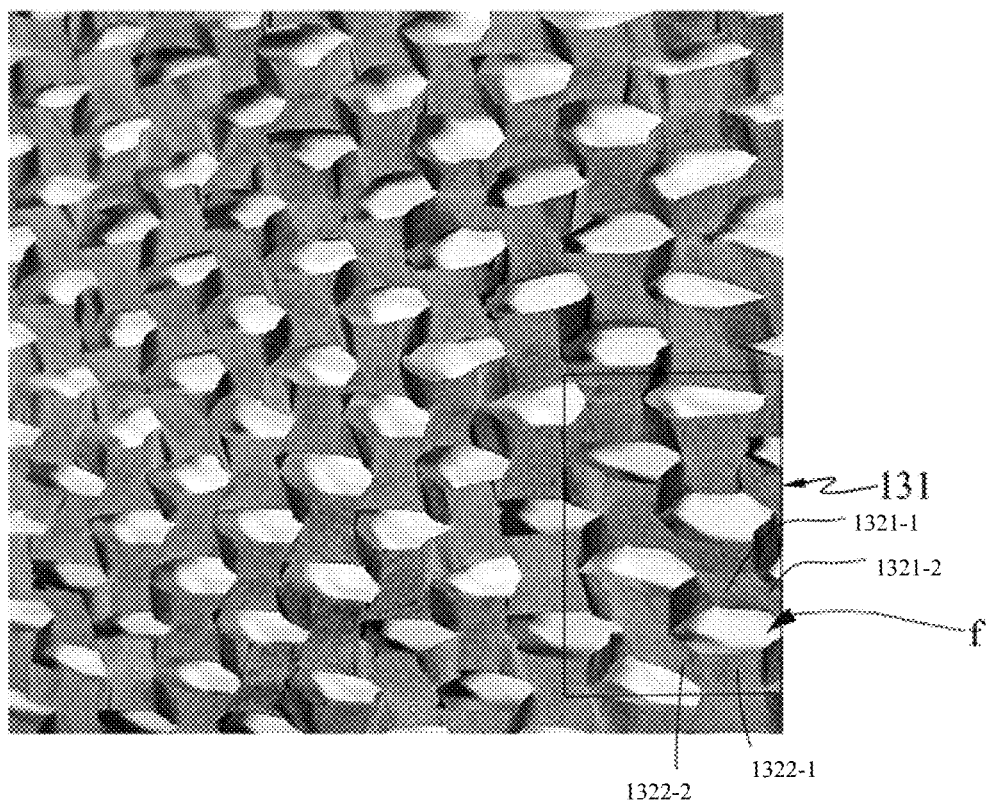
FIG. 15 is a schematic view of an actual object of the liner of the present disclosure.

Referring to FIG. 15, the three-dimensional polygonal opening f is a hexagon-like shape and is consisted of the first platform segment 1321-1 of the first arch structure 1321, two first transition segments 1321-2 of the first arch structure 1321, the second platform segment 1322-1 of the second arch structure 1322 and two second transition segments 1322-2 of the second arch structure 1322. The first platform segment 1321-1 and the second platform segment 1322-1 are arranged relative to each other.

In an embodiment of the present disclosure, a length of the die-cutting knife line 142 is A, a distance of every two adjacent die-cutting knife lines 142 on the same disconnected line 141 is between A/5~A/3, a distance of every two adjacent die-cutting knife lines 142 on the same disconnected line 141 is between A/6~A/4. A dislocation space is between the nearest two die-cutting knife lines 142 on the two adjacent disconnected lines 141 is A/3.

Figure 16:
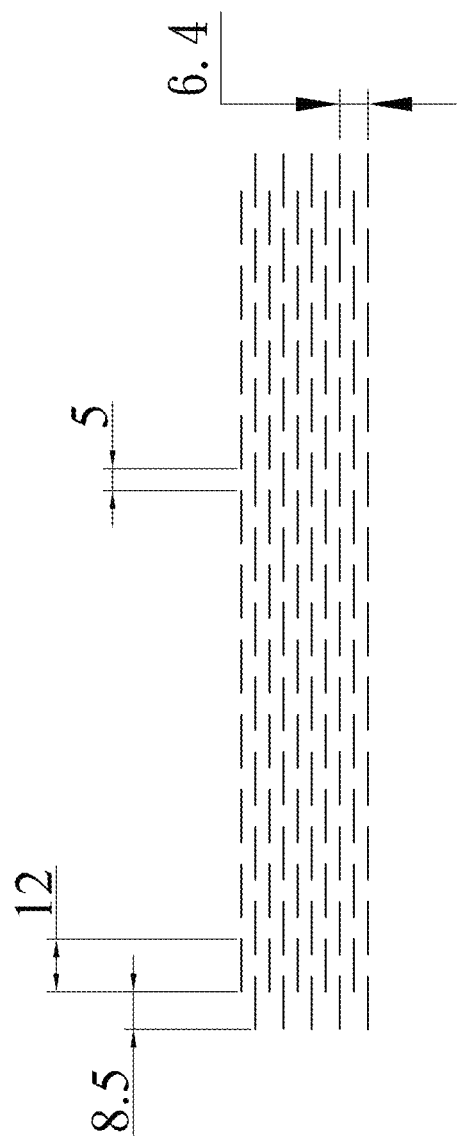
FIG. 16 is a schematic view of an optimal size of die-cutting paper of forming the liner of the present disclosure.

Referring to FIG. 16, in a preferred embodiment of the present disclosure, the length of the die-cutting knife line 142 is 12 mm, at this time, the liner 13 is formed by stretching the die-cutting paper 14 under external forces, it can be ensured that a ratio of an elongated length of the liner 13 in a direction perpendicular to the disconnected line 141 to an original length of the liner 13 in the direction perpendicular to the disconnected line 141 is between 30%~40%, and an expansion thickness of the liner 13 in the direction perpendicular to a plane of the die-cutting paper 14 is greater than 5 mm. In this way, it can not only ensure the buffer effect of the liner 13 to the maximum extent, but also can solve the technical problem that the network structure is easy to be torn and broken when stretching the die-cutting paper 14.

In an embodiment of the present disclosure, when the liner 13 is stretched in accordance with a dimension shown in FIG. 16, an angle α of the first platform segment 1321-1 and the second platform segment 1322-1 respectively inclined to the buffer surface e is 30~75°, which can provide an optimal buffer effect.

Figure 17:
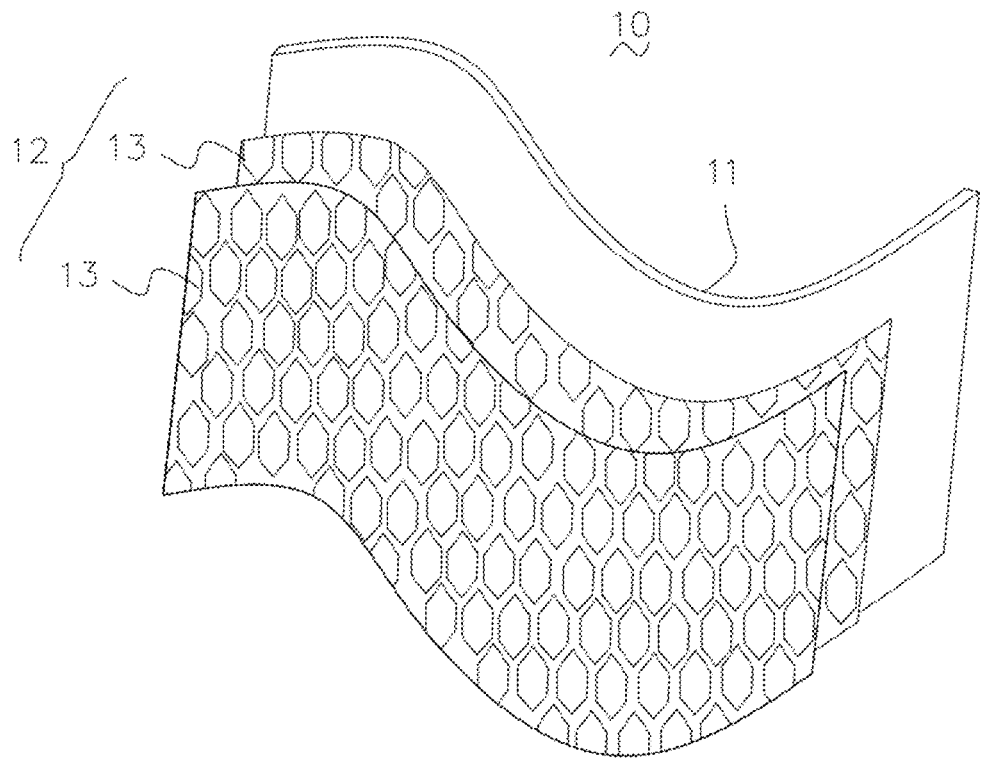
FIG. 17 is a schematic view of a planar structure with multi-layers of liners of the present disclosure.

Referring to FIG. 17, in accordance with the present disclosure, the protecting layer 12 can include multi-layers of liners 13, that is, there are more than two layers of liners 13. At this time, each layer of liners 13 is a network structure formed by stretching the die-cutting paper 14, and the multi-layers of liners 13 are overlapped together to form the protecting layer 12 for further improving the protection strength relative to only one layer of liners 13.

Figure 18:
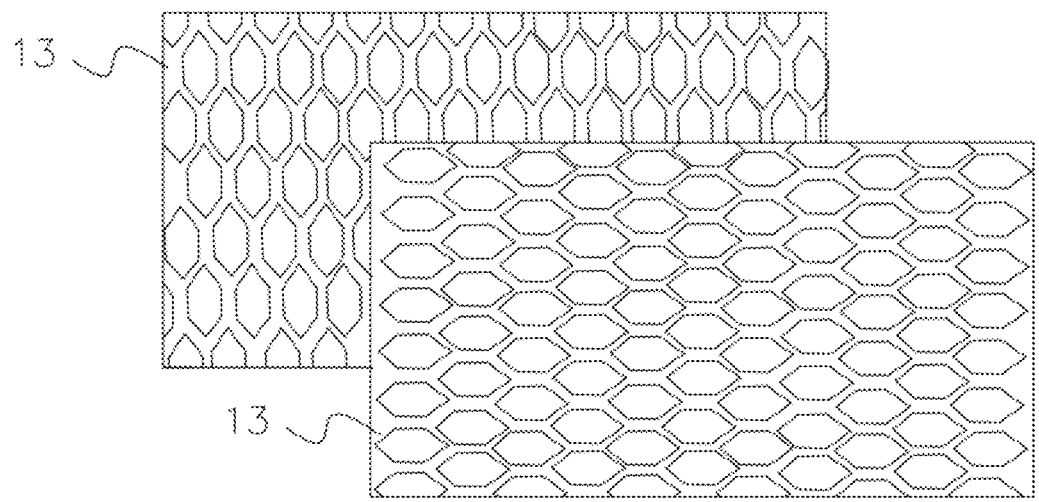
FIG. 18 and FIG. 19 are schematic views of different angle settings of multi-layers of liners of the present disclosure.
Figure 19:
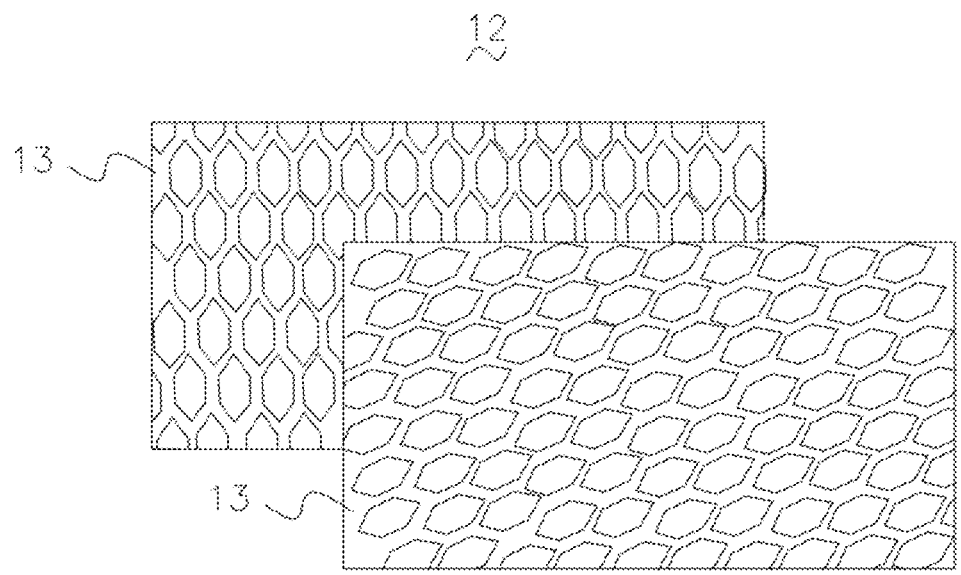

Referring to FIG. 18 and FIG. 19, in accordance with the present disclosure, when the protecting layer 12 is formed after overlapping the multi-layers of liners 13 by a variety of overlapping methods. For example, a horizontal and vertical overlapping way, that is, a layout of one row of die-incisions 143 in one layer of liners 13 is perpendicular to a layout of the die-incisions 143 in the other layer of liners 13. A cross overlapping way, that is, an angle is formed between a layout of one row of die-incisions 143 in one layer of liners 13 is perpendicular to a layout of the die-incisions 143 in the other layer of liners 13. A staggered overlapping way, that is, a layout of one row of die-incisions 143 in one layer of liners 13 is located between the other two adjacent rows of die-incisions 143 in the other layer of liners 13. In conclusion, the die-incisions 143 on one said die-cutting paper 14 do not overlap or do not overlap completely with the die-incisions 142 on an adjacent sad die-cutting paper 14. The multi-layers of liners 13 without being completely overlapped therebetween are provided for making the protecting layer 12 softer to further improve its protection performance.

Figure 20:
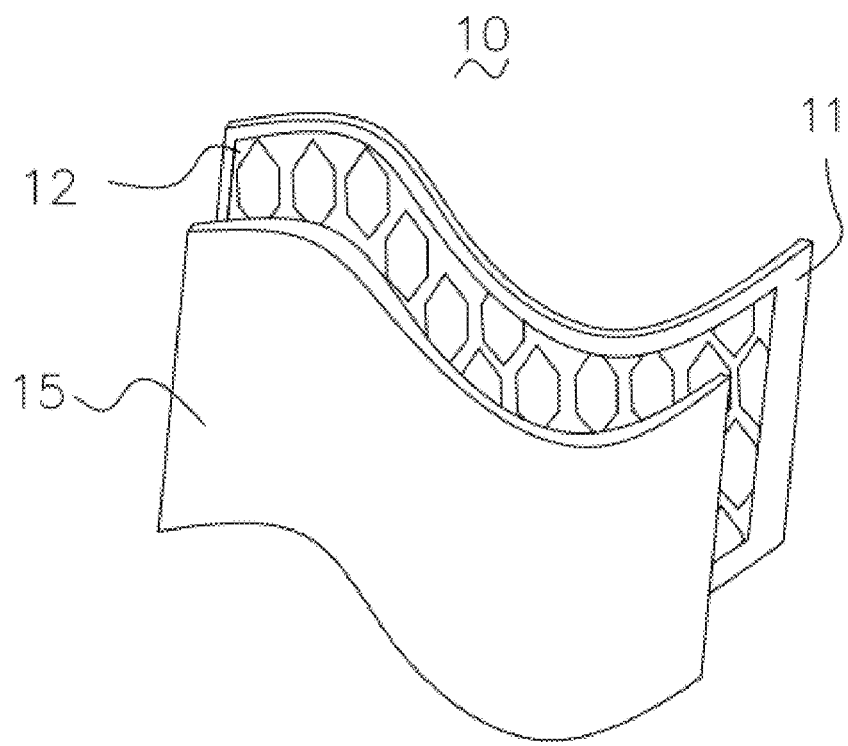
FIG. 20 is a schematic view of another planar structure with a second surface in accordance with an embodiment of the present disclosure.

Referring to FIG. 20, in accordance with the present disclosure, the planar structure 10 includes a second surface 15 so that the protecting layer 12 can be clamped between the first surface 11 and the second surface 15.

In accordance with the present disclosure, the first surface 11 is made of material same as that of the second surface 15, and the protecting layer 12 is set between the first surface 11 and the second surface 15, thereby the loose protecting layer 12 can be prevented from interfering with the packages and express items so as to avoid the protecting layer 12 from falling off during using the planar structure 10. At the same time, it can also increase structural strength of the planar structure 10 and prevent the planar structure 10 from tearing off.

Figure 21:
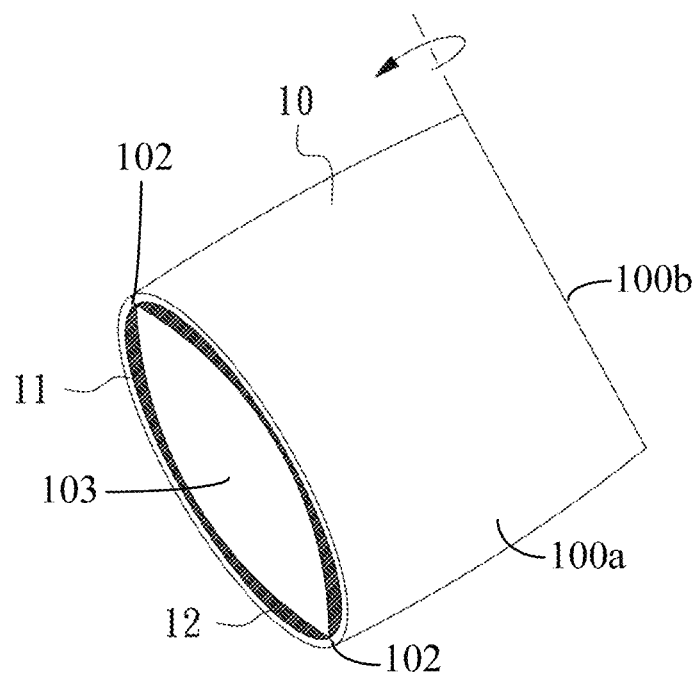
FIG. 21 & FIG. 22 are schematic views of a bag body by folding the planar structure of the present disclosure.
Figure 22:
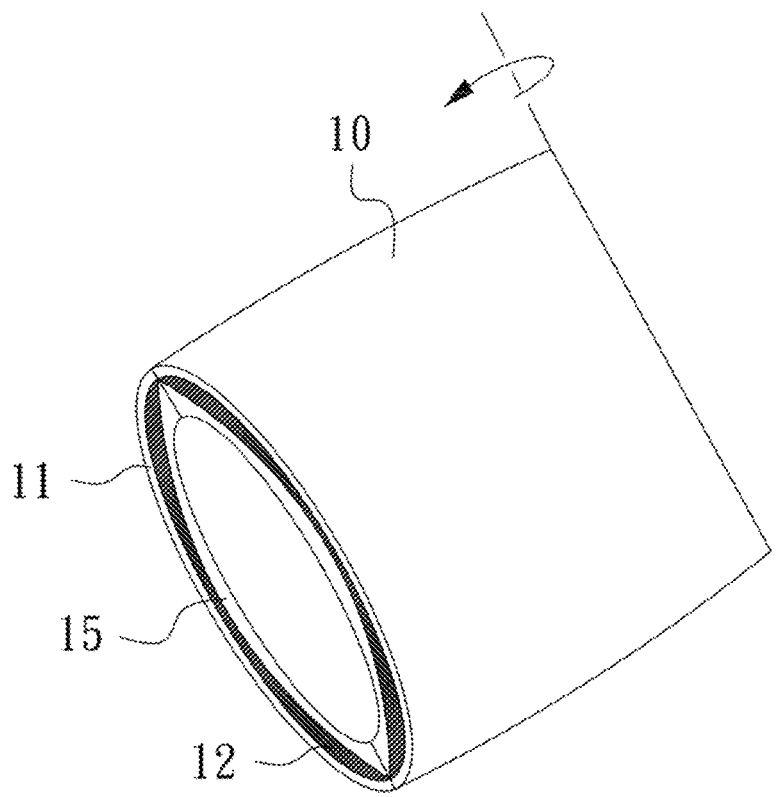

Referring to FIG. 21 and FIG. 22, another packaging structure 100 of the present disclosure is formed by the planar structure 10 after the planar structure 10 is folded with its two edges 102 being sealed, and the packaging structure 100 is a bag body 100a. At this time, the planar structure 10 includes an embodiment which includes the first surface 11 and the protecting layer 12, as well as another embodiment which includes the first surface 11, the protecting layer 12 and the second surface 15. Specifically, after the packaging structure 100 is formed by folding the planar structure 10, the two edges 102 of the packaging structure 100 perpendicular to a folding line 100b are adhered to each other, and an opening 103 is reserved on an opposite end parallel to the folding line 100b to form the bag body 100a, thereby the bag body 100a of the packaging structure 100 is formed. In this way, a product to be wrapped or a postal express product can be put into the bag body 100a through the opening 103. After the product is put into the bag body 100a, it can be surrounded by the protecting layer 12 to be protected.

Figure 23:
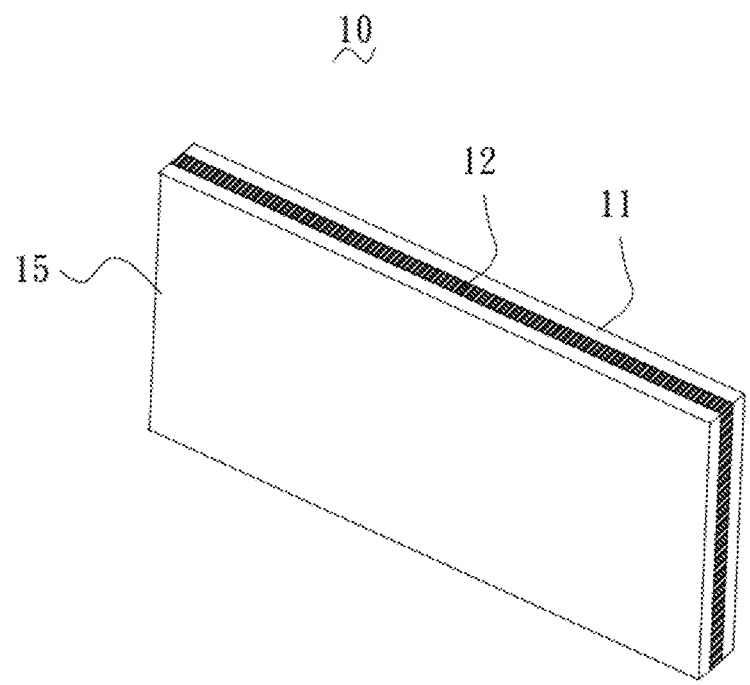
FIG. 23 is a schematic view of an overlapping way of the liner of the present disclosure.

Referring to FIG. 23, in accordance with the present disclosure, the protecting layer 12 is completely overlapped on the first surface 11, or the first surface 11 and the second surface 15. Referring to FIG. 21 and FIG. 22, at this time, when the planar structure 10 is folded, after the two edges 102 of the bag body 100a are adhered to each other, an inner wall of the bag body 100a is arranged with the protecting layer 12 without a cover being provided on its opening position of the bag body 100a for sealing the bag body 100a.

Figure 24:
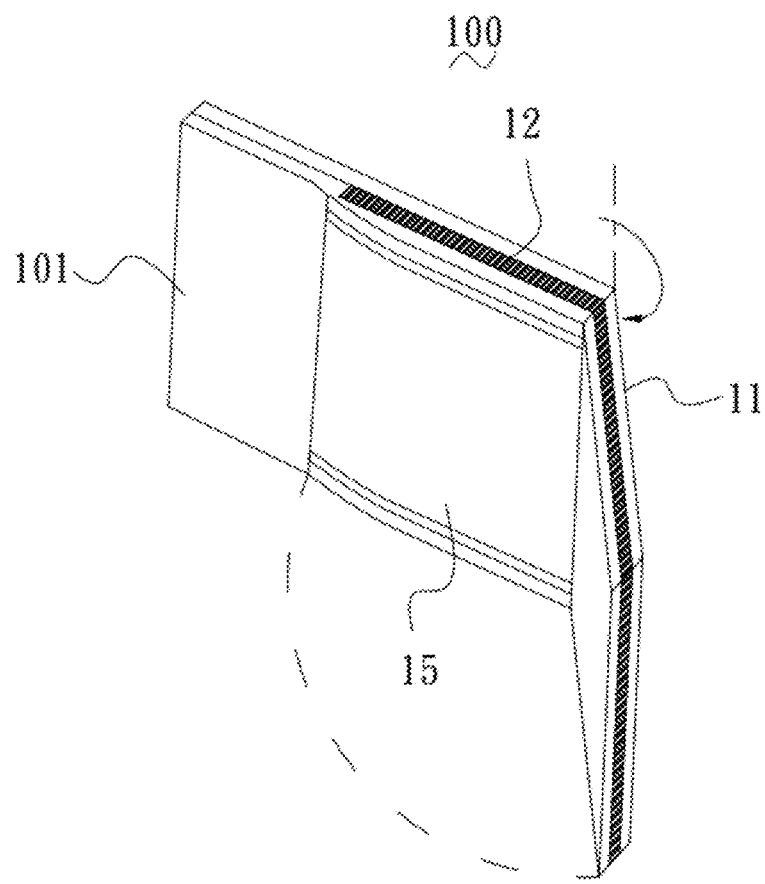
FIG. 24 is a schematic view of the bag body formed by the planar structure with different overlapping ways of liners.
Figure 25:
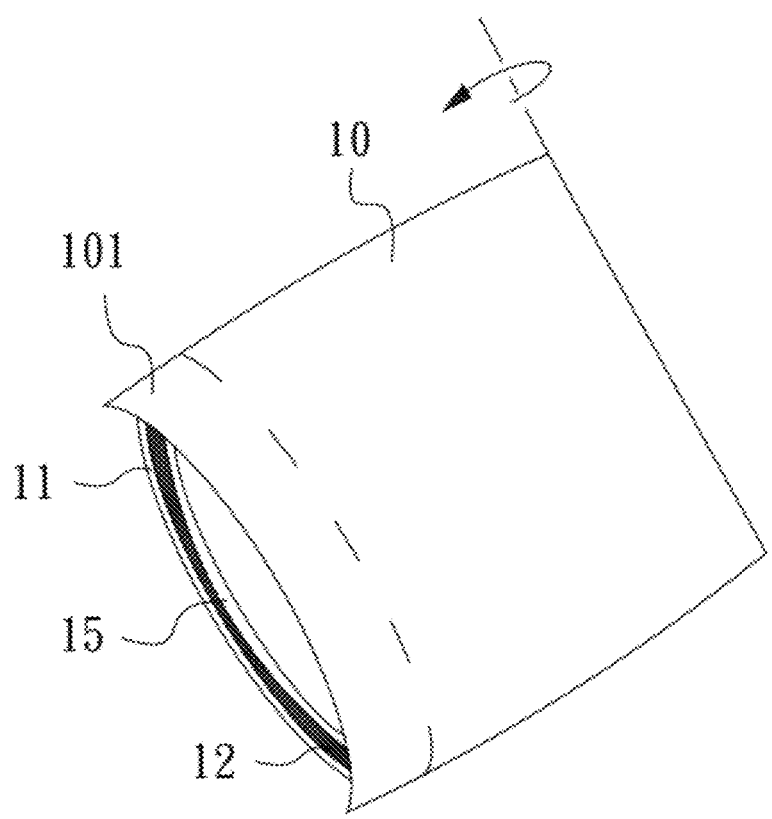
FIG. 25 is a schematic view of the bag body with a cover thereon of the present disclosure.

Referring to FIG. 24 and FIG. 25, in accordance with the present disclosure, the protecting layer 12 isn't completely overlapped on the first surface 11, or the first surface 11 and the second surface 15. A bare region 101 is reserved on the first surface 11 or on the first surface 11 and the second surface 15. At this time, when folding the planar structure 10, the bare region 101 is formed outside of an area to be folded, after the planar structure 10 is folded, the bare region 101 is acted as a cover for a newly formed bag body 100a to close the opening 103 of the bag body 100a.

In the above embodiments of the present disclosure, the first surface 11, the second surface 15 and the protecting layer 12 are all made of recyclable environmental protection materials.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A fully recyclable environmental protection packaging structure which is a bag body, comprising a front surface and a back surface opposite to the front surface, both the front surface and the back surface respectively made of a planar structure of paper, the planar structure comprising:
   a first surface and a protecting layer overlapped on the first surface;
   the protecting layer comprising at least one layer of liner which is a three-dimensional network structure;
   the liner comprising a plurality of rows of unit strips arranged thereof, and each row of unit strips comprising a plurality of arch structures connected in turn, each arch structure comprising a first arch structure and a second arch structure; the first arch structure comprising a first platform segment and two first transition segments respectively arranged on two opposite ends of the first platform segment, and the first platform segment higher than the first transition segment; the second arch structure comprising a second platform segment and two second transition segments respectively arranged on two opposite sides of the second platform segment, and the second platform segment lower than the second transition segment; the first arch structure arranged alternately with the second arch structure in the same unit strip, the first transition segment of the first arch structure overlapped or connected with the second transition segment of an adjacent second arch structure; and wherein
   the first transition segment of the first arch structure in the unit strip is connected with the second transition segment of the nearest second arch structure in another adjacent unit strip; a three-dimensional polygonal opening is formed between the second arch structure in one unit strip and the first arch structure in the other unit strip arranged relatively.

2. The fully recyclable environmental protection packaging structure as claimed in claim 1, wherein a connecting line is formed between every two adjacent unit strips, and a plane where the connecting lines are located is a buffer surface, the first platform segment and the second platform segment respectively inclined relative to the buffer surface, the first transition segment extending from the buffer surface to the first platform segment, and the second transition segment extending from the buffer surface to the second platform segment.

3. The fully recyclable environmental protection packaging structure as claimed in claim 1, wherein the three-dimensional polygonal opening is a hexagon-like shape and is consisted of the first platform segment of the first arch structure, two first transition segments of the first arch structure, the second platform segment of the second arch structure and two second transition segments of the second arch structure, and the first platform segment and the second platform segment arranged relative to each other.

4. The fully recyclable environmental protection packaging structure as claimed in claim 1, wherein the planar structure comprises a second surface so that the protecting layer is clamped between the first surface and the second surface.

5. The fully recyclable environmental protection packaging structure as claimed in claim 2, wherein the liner is another form after the die-cutting paper is stretched, a plurality rows of disconnected lines is formed by die-cutting the die-cutting paper, and each row of disconnected lines comprises a plurality of die-cutting knife lines arranged thereon at interval after the each row of disconnected lines is die-cut, and a die-incision formed by stretching the die-cutting knife line.

6. The fully recyclable environmental protection packaging structure as claimed in claim 5, wherein a length of the die-cutting knife line is A, a distance of every two adjacent die-cutting knife lines between A/5~A/3, a distance of every two adjacent die-cutting knife lines on the same disconnected line between A/6~A/4; a dislocation space between the nearest two die-cutting knife lines on the two adjacent disconnected lines is A/3.

7. The fully recyclable environmental protection packaging structure as claimed in claim 5, wherein after the liner is formed by stretching the disconnected line, a ratio of an elongated length of the liner in a direction perpendicular to the disconnected line to an original length of the liner in the direction perpendicular to the disconnected line is between 30%~40%; an expansion thickness of the liner in the direction perpendicular to a plane of the die-cutting paper is greater than 5 mm.

8. The fully recyclable environmental protection packaging structure as claimed in claim 5, wherein the protecting layer comprises multi-layers of liners which are superimposed to form the protective layer.

9. The fully recyclable environmental protection packaging structure as claimed in claim 6, wherein the protecting layer isn't completely overlapped on the first surface and/or the second surface, and a bare region is reserved on the first surface and/or the second surface, the bare region opposite to the opening.

* * * * *